United States Patent [19]

Keefe et al.

[11] 4,199,096
[45] Apr. 22, 1980

[54] SOLDER DEVICE HAVING CARTRIDGE FEED OF SOLDER

[75] Inventors: Richard A. Keefe, Wilmette, Ill.; David B. Schurman, Jr., Carver; Jon W. Leask, Squantum, both of Mass.

[73] Assignee: Home Solder Corporation, Wilmette, Ill.

[21] Appl. No.: 764,606

[22] Filed: Feb. 1, 1977

[51] Int. Cl.² .............................................. B23K 3/06
[52] U.S. Cl. ................................. 228/52; 219/230; 226/127; 226/167
[58] Field of Search ......................... 228/52, 53, 101; 219/230; 226/167, 127, 128, 166; 200/245; 74/141.5, 156, 575, 577

[56] References Cited

U.S. PATENT DOCUMENTS

| | | | |
|---|---|---|---|
| 2,578,824 | 12/1951 | Morrison | 200/245 X |
| 2,765,390 | 10/1956 | Chapel et al. | 228/53 |
| 3,171,374 | 3/1965 | Frenzel | 228/53 |
| 3,390,826 | 7/1968 | Davis | 228/53 |

Primary Examiner—Francis S. Husar
Assistant Examiner—Kenneth J. Ramsey

[57] ABSTRACT

An improved soldering device is provided, one that is structured for the reception of and use with a new cartridge that is a self-contained supply of solder. When the cartridge is inserted within the soldering device, an operator, using only one hand, is able to advance the solder from out of the cartridge and to a location in close proximity with the soldering tip of the device. With that same single hand, the operator can energize the heating element to supply heat to the soldering tip. The advancing and energizing structure permits the device to remain energized throughout the advancing operation or, optionally, to smoothly effect an intermittent energization and deenergization of the heating element to reduce the total quantity of heat supplied to the soldering tip even while the solder is being advanced.

16 Claims, 9 Drawing Figures

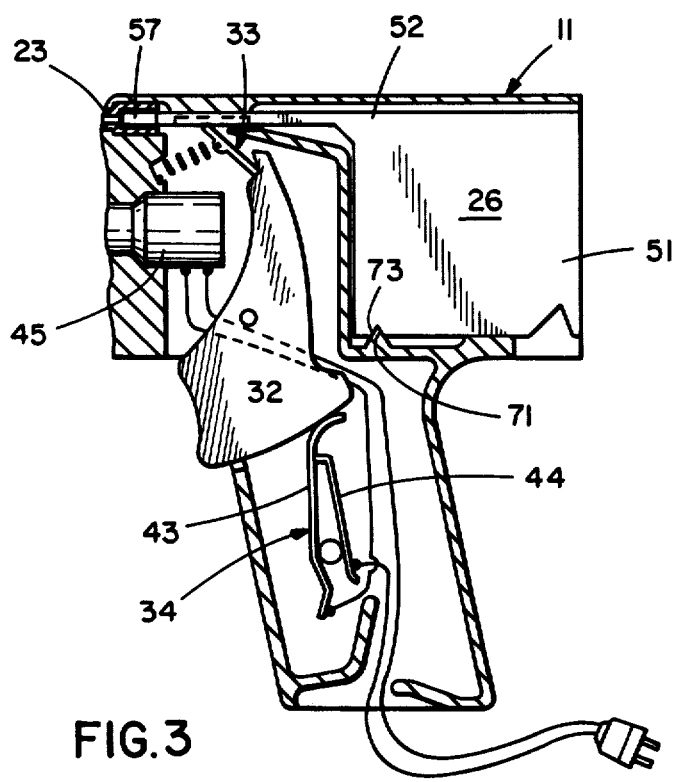
FIG.3
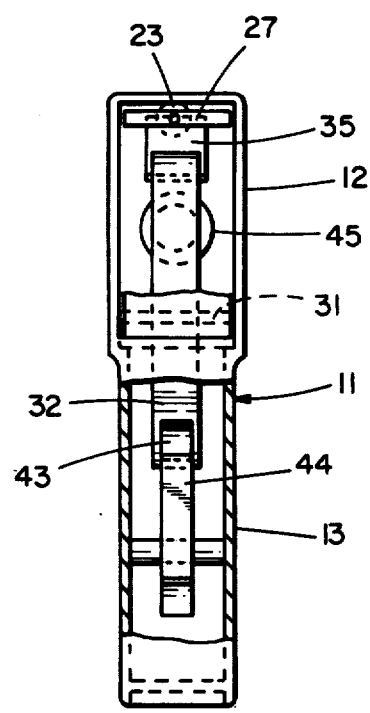
FIG. 4
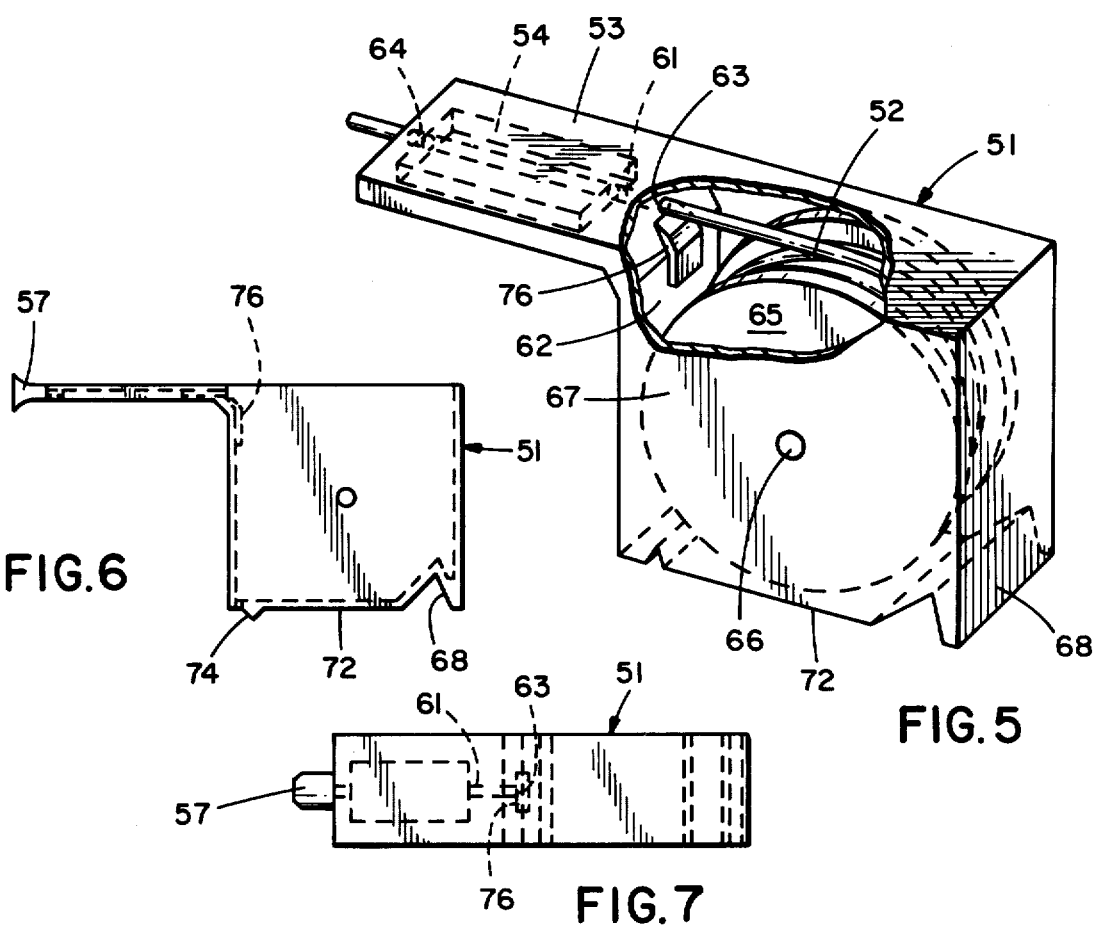
FIG.5
FIG.6
FIG.7

SOLDER DEVICE HAVING CARTRIDGE FEED OF SOLDER

BACKGROUND OF THE INVENTION

This invention relates generally to a method and device for soldering that includes an integrated solder feed. It further relates to a cartridge that is a compact, self-contained solder supply and to a combination of the device and the cartridge.

It has long been recognized that various advantages are realized by incorporating into a soldering iron or a soldering gun some attendant structure that will bring a supply of soldering material to a location that is near that of the heated tip of the soldering device. Many proposed methods and devices of this nature require the use of only one hand of the operator, thereby freeing the other hand for other useful functions such as securing the article being soldered or readying the next article to be soldered. Important advances in this art have been achieved by Frenzel U.S. Pat. No. 3,171,374 and Schurman U.S. Pat. No. 3,824,371.

Prior art methods and structures are disadvantageous in that either they are not themselves self-contained supplies of solder or they require the addition of cumbersome structural elements that often require solder advancing means that are operated separately from the heat actuating means of the solder device itself. In prior structures, before use can begin, the operator must actually feed the solder itself, usually the leading end of a length thereof, into that portion of the device which advances the solder toward the heating tip.

With these previously known structures, this required feeding aspect results in inefficiencies brought on by the time and inconvenience needed to initiate and carry out the actual feeding process. These disadvantages are aggravated when the solder utilized is in the form of a soft wire that must be passed into the feeding mechanism and through the advancing mechanism of the device. The feeding and advancing operations can require careful attention to be certain that the solder is initially inserted in the proper location and in the proper manner. Additional problems and difficulties can arise if the means used to advance the solder through the advancing mechanism itself is so forceful as to damage or even break the solder supply, resulting in a jamming of the advancing apparatus.

It is accordingly an object of the present invention to provide an improved method and device for soldering and for supplying solder that is compact and efficient both in its ability to feed the solder and also in its facilitation of the task of providing a fresh supply of solder.

A further object of this invention is an improved method and device that provide a compact, self-contained unit for supplying solder with a minimum of difficulty and that provide the heat required to effect customary soldering operations.

Another object of this invention is an improved soldering method and device incorporating an integrated supply of solder and requiring but a single control means for the operation of both the soldering and advancing functions.

Yet another object of this invention is an improved method and an improved self-contained soldering device, having a single control means which permits the operator to choose among performing the heating function only, performing the advancing function while maintaining the heating function, or performing the advancing function while intermittently performing the heating function.

Still another object of this invention is a new cartridge for providing a convenient and compact supply of soldering materials.

Another object of this invention is a new cartridge that is structured for mating and feeding engagement with a soldering device.

SUMMARY OF THE INVENTION

The present invention is an improved soldering device including a single finger control for activating both a heating means and a means for advancing a supply of solder, the finger control being capable of activating either the heating means only, both the heating means and advancing means simultaneously, or the advancing means together with intermittent actuation of the heating means. The present invention is also a method and an apparatus that combine self-feeding, self-actuating soldering features with a compact, encased supply of solder. This invention is also a cartridge having a supply of solder therein and structured for providing solder to a self-feeding soldering device.

We provide an improved method of soldering, comprising: providing a compact, encased supply of solder; inserting said encased supply within a cavity and into mating relationship with an elongated guiding zone; pawling a portion of said solder from out of said encased supply and into said guiding zone to a location remote from said encased supply; and supplying heat to an area that is proximate to said remote location.

We also provide an improved solder device, comprising: a body portion; a soldering member and a guiding conduit projecting from said body portion; a control member pivotally mounted within said body portion; an electrical switch means for actuating said soldering member, said switch means being located for arcuate communication with said pivotally mounted control member; and a pawl means for advancing a supply of solder through said guiding conduit, said pawl means being located for communication with said control member.

We further provide a cartridge for providing a supply of solder, comprising: a plurality of panels forming an encasing means; a supply of solder within said encasing means; and a finger member projecting from said encasing means, said finger member having a sleeve, and said sleeve opening into said encasing means for receiving said supply of solder.

The invention also is directed to a combined solder device and solder cartridge, comprisng: a body portion of said device; a pocket within said body portion; a soldering member and a guiding conduit projecting from said body; a cartridge within said pocket, said cartridge being in a mating relationship with said guiding conduit; a supply of solder within said cartridge; and a means for advancing said solder out of the cartridge and through said guiding conduit.

BRIEF DESCRIPTION OF THE DRAWINGS

Additional objects, if not set forth specifically herein, will be readily apparent to those skilled in the art from the detailed description of the invention which follows and from the drawings in which:

FIG. 3 is a partial view of FIG. 2, except that the finger control member is only partially depressed;

FIG. 4 is an end elevation view of the preferred device;

FIG. 5 is a perspective view of the preferred cartridge;

FIG. 6 is an elevation view of an alternate embodiment of the cartridge;

FIG. 7 is a plan view of an alternate embodiment of the cartridge;

DESCRIPTION OF THE PREFERRED EMBODIMENTS

Figure 1:
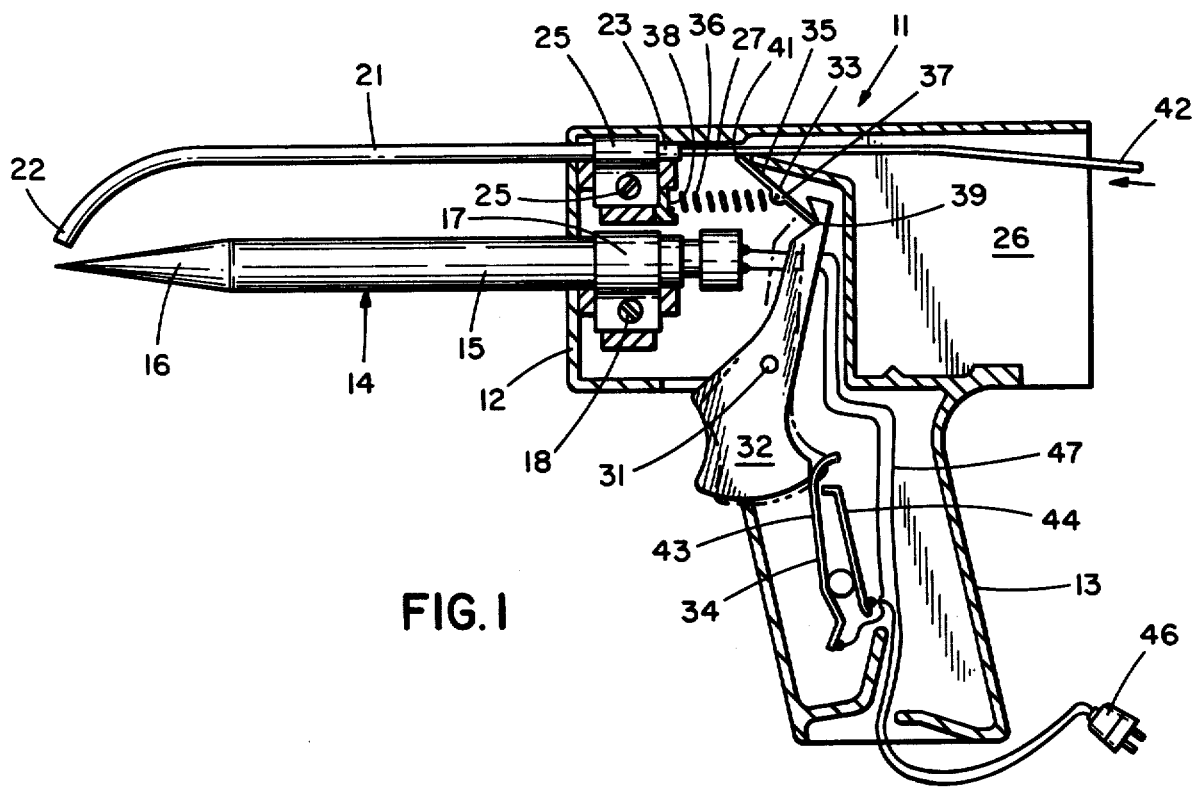
FIG. 1 is an elevation view of the preferred soldering device, the casing having been broken away for clarity, showing the control member when it is fully extended.

It has been determined that more efficient and convenient soldering can be brought about by an improved soldering method. The method includes providing a compact, encased supply of solder which is subjected to pawling action to advance the solder supply to a location remote from the encased supply and close to a source of heat which may be provided for the purpose of bringing the solder to a soldering temperature.

More particularly, the preferred method includes encasing a supply of solder in a compact manner, the encasing step being accomplished in a manner that facilitates removal of the supply of solder at a single, precisely positioned location. This can be brought about, for example, by winding an elongated supply of solder around itself, encasing the wound supply while maintaining its leading portion unwound and accessible from outside of the encasing material, and automatically aligning the leading portion into mating readiness with a point immediately outside the encased supply.

In the preferred method, the encased supply of solder is then inserted into a substantially enclosed cavity within a soldering device. This cavity is generally shaped and sized to closely accommodate the encased supply of solder.

Another step in the preferred method includes pawling a portion of the supply of solder while it is within the encased, compact location. This pawling step initiates an advancing step whereby the leading portion of the solder is passed out of the encased supply and directly into an elongated guiding zone. The guiding zone generally includes an entrance that is in mating readiness with said point immediately outside the encased supply. In the elongated guiding zone, a guiding step is accomplished for advancing the solder from the encased supply to a location remote therefrom.

The method also includes supplying a source of heat proximate to said remote location by closing an electrical switch means. The heat is provided to achieve soldering temperatures at this location which may be transmitted to the leading portion of the supply of solder by appropriate conduction methods.

In the preferred method, the pawling and heating steps are brought about during a single controlling step which utilizes a unitary pivoting action upon a pawling means and the electrical switch means. The preferred pivoting step includes a simultaneous rearward displacement toward the switch means to accomplish a switch closing step and a forward displacement toward the pawling means to accomplish the pawling step.

The pivoting step may include three alternate and/or sequential steps. One such step is activating the electrical switch means for effecting the heating step. Another is performing the pawling step while simultaneously activating the switch means to accomplish a heating step that constantly adds heat to said source of heat proximate to the remote location. The other is intermittently activating the switch means while simultaneously performing the pawling step.

As shown in FIG. 1, the device, generally indicated by reference numeral 11, includes a body portion 12 and a handle portion 13. Projecting from body portion 12 is a soldering member, generally referred to by reference numeral 14. Member 14 includes a shank 15 having a heating element therein (not shown) and a soldering tip 16. Member 14 is secured to body member 12 by any suitable means, such as a bracket 17 and a screw 18 as depicted.

Mounted above member 14 is a guiding conduit 21 that is open both at its remote end 22 and at its receiving end 23. Attachment of conduit 21 to body 12 may be accomplished by a bracket 24 and a screw 25. Member 14 and conduit 21 are mounted in cooperative relationship such that the open remote end 22 is close proximity to soldering tip 16.

A pocket 26 is provided with body portion 12. Located between the pocket 26 and the open receiving end 23 is a passageway 27.

A pivot 31 is provided on body member 12. Rotatably positioned on pivot 31 is a control member 32. The upper end of control member 32 is in communication with a pawl means, generally indicated by reference numeral 33. The lower portion of control member 32 is generally in communication with an electrical switch means, generally referred to by reference numeral 34. This single control member 32, when manipulated by the operator of the device 11, accomplishes a variety of effects upon pawl means 33 and switch means 34.

Pawl means 33 includes a pawl member 35 and a biasing means, such as spring 36. Spring 36 supplies a combined rearward and upward bias upon pawl 35. A securement member, such as tooth 37, provides the necessary pivotal-type communication between pawl 35 and spring 36. The other end of spring 36 rests against and may be secured to a stop 38 within the body member 12.

Pawl 35 rests within a recess or notch 39 of control member 32. With this arrangement, as the operator's finger moves control member 32 rearwardly, notch 39 moves generally forwardly in opposition to the bias of spring 36. This accomplishes a pawling effect that can be communicated by the edge 41 of pawl 35 to a source of solder 42. Edge 41 may be substantially flat, may be beveled, may be rounded, or may have any other surface configuration that will achieve positive pawling action with minimal damage to the particular solder supply used.

Electrical switch means 34 is likewise activated by control member 32. Switch means 34 includes a front flexable contact arm 43 and a rear flexable contact arm 44. Respective ends of arms 43 and 44 are in electrical contact with a transformer 45 and an electrical plug 46 by means of standard electrical circuitry, generally referred to by reference numeral 47. The transformer 45 is in electrial communication with the heating element within shank 15, whereby heat may be provided to soldering tip 16 when current is passed to transformer 45.

With control member 32 being in the position shown in FIG. 1, pawl means 33 is in its rearwardmost, loading position. At the same time, electrical switch means 34 is open; that is, arm 43 is not in contact with arm 44.

Figure 2:
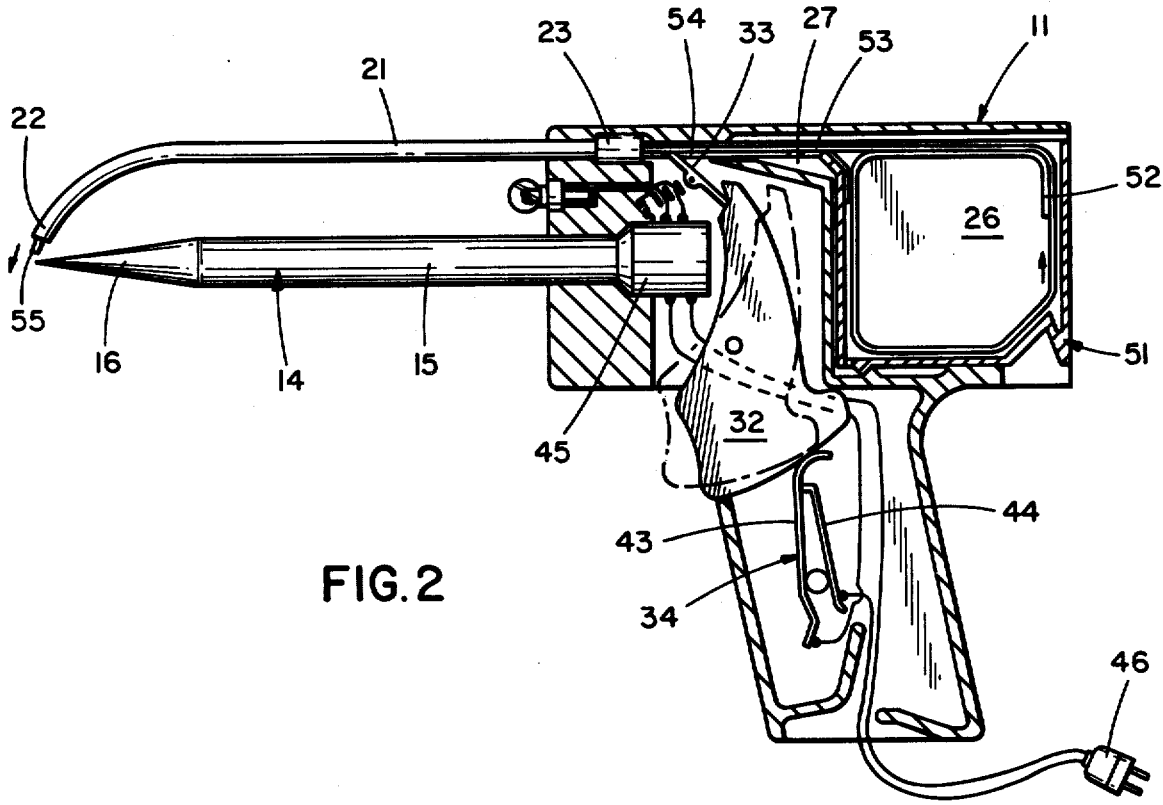
FIG. 2 is an elevation view of the preferred device and cartridge, with the casing broken away for clarity and with the control member fully depressed.

FIG. 2 shows the preferred device with control member 32 in its rearwardmost position. This attitude of control member 32 places pawl means 33 in its fully spent position. Also, switch means 34 is closed when control member 32 is in its rearwardmost position as shown. With switch 34 closed, electrical current supplied through plug 46 passes to transformer 45. This activates the heating element within shank 15 to bring soldering tip 16 to soldering temperatures.

A cartridge, generally referred to by reference numeral 51, is shown in FIGS. 2 and 3 when it is fully inserted into pocket 26. The cartridge 51, described in more detail hereinafter, provides an encased supply of solder 52. Only a portion of the solder supply 52 is shown in FIGS. 2 and 3. The supply of solder 52 is provided inside of cartridge 51 so that it rests within a finger member 53 of cartridge 51.

Finger 53 is structured such that, when cartridge 51 is fully inserted by a simple sliding motion into pocket 26, the leading end of solder supply 52 is poised for mating relationship with guide 23. When cartridge 51 is thus inserted, finger 53 lies within passageway 27. Located along the underside of finger 53 is opening 54. Access to the underside solder source 52 is provided by this opening 54. Pawl means 33 is structured and located so that its edge 41 may utilize this access through opening 54 in order to communicate with solder source 52.

Accordingly, when pawl means 33 moves from its loading position as shown in FIG. 1 through its spent position as shown in FIG. 2, the solder supply 52 moves forward through finger 53 for a distance approximately equal to the length of opening 54. As this occurs, the leading end of solder supply 52 passes through the open receiving end 23 of guiding conduit 21, then within conduit 21, eventually emerging through open remote end 22. This leading end is shown in FIG. 2 as reference numeral 55. Accordingly, when the operator proceeds with a number of movements of control member 32 between its forwardmost position and its rearwardmost position, the solder supply 52 is conveniently provided through the open remote end 22 of conduit 21, in close proximity to soldering tip 16.

Ideally, leading end 55 exits conduit 21 such that one-half of its exposed front surface contacts tip 16 and the other half contacts the workpiece, to provide a further path for heat from tip 16 to the workpiece. Accordingly, to position leading end as exactly as possible for each use of the device, remote end 22 is positioned as near to tip 16 as is practical, without allowing the solder within conduit 21 to melt or soften. A distance of approximately ⅛ inch to 3/16 inch has been found quite effective.

The i.d. of the conduit 21 will preferably be dimensioned to restrict closely the solder 52 so that the leading end 55 can be accurately positioned with respect to tip 16. A clearance on the order of thousandths of an inch has been found to be effective for this purpose.

FIG. 3 shows the preferred device with control member 32 in a position that is only slightly rearward of its forwardmost, loading position. This position is referred to herein as the solder-contacting position. In the position depicted, contact arm 43 has been bent slightly by control member 32 to engage contact arm 44, thus energizing the heating element within shank 15. In this same position of control member 32, the edge 41 of pawl means 33 is placed into contact, although not moving contact, with solder supply 52. This structure permits the operator to utilize device 11 solely as a soldering gun; that is, the soldering tip 16 is heated to a soldering temperature, but the supply of solder 52 is not advanced so as to emerge at the open remote end 22.

With the structure shown, the operator of device 11 may, if desired, operate only the electrical switch means 34, as shown in FIG. 3, to raise soldering tip 16 to a soldering temperature, without advancing solder supply 52, even when cartridge 51 is fully inserted within pocket 26.

Alternatively, the operator may manipulate control member 32 so as to bring a steady supply of heat to tip 16 while at the same time advancing solder supply 52 through open remote end 22 as desired. Such a steady supply of heat will generally cause an increase in temperature of tip 16. This is accomplished by moving control member 32 between the position shown in FIG. 3 and that shown in FIG. 2.

The operator also has the further option of moving control member 32 between the positions shown in FIG. 1 and in FIG. 2. When this is done, the solder supply 52 is advanced as desired, but the switch means 34 opens and closes intermittently, thereby avoiding a continuous supply and buildup of heat at solder tip 16. This later alternative gives the operator some flexability in maintaining a desired soldering temperature while advancing solder supply 52 through guiding conduit 21.

In an alternate embodiment shown in FIG. 2, a light 56 is in communication with switch means 34, preferably through transformer 45. This brings with it two advantages. The light 56 provides useful illumination of the soldering tip 16 and the open remote end 22. It also can serve the useful function of aiding the operator in determinating when the switch means 34 is closed. This later advantage can be especially useful to the operator in selecting the desired alternative combined operations of the pawling means 33 and the switch means 34.

In general, the mating relationship between the open receiving end 23 of the conduit 21 and the finger 53 of cartridge 51 is a simple end-to-end abutting relationship, such as depicted in FIG. 2. As an alternate embodiment, a mating relationship such as that shown in FIG. 3 can be utilized in order to lessen frictional build-up at the point of mating and in order to provide a more precise mating relationship. This structure incorporates a ferrule 57.

In the embodiment depicted in FIG. 3, the outside diameter of ferrule 57 is slightly less than the inside diameter of the open receiving end 23 of guiding conduit 21. Accordingly, when cartridge 52 is inserted into the pocket 26 of the device 11, the ferrule 57 passes into open receiving end 23 to provide a precise, friction-reduced relationship, thereby facilitating passage of solder supply 52 through guiding conduit 21. If desired, and if space permits, the outside surface of the leading edge of ferrule 57 may be beveled or flared, with the outside surface of the open receiving end 23 of conduit 21 being correspondingly flared or beveled. In such arrangements, shown in more detail in FIGS. 6 and 7, the bevel angle and the flare angle are approximately the same, resulting in further improved mating relationship.

FIG. 4 provides an elevation rear end view of device 11 without cartridge 51 inserted within pocket 26. It affords another view of the communication between the control member 32 and the pawl 35, as well as the communication between the control member 32 and the flexible front contact arm 43.

The preferred cartridge 51 is depicted in perspective in FIG. 5. It includes finger member 53, having underside opening 54. In the arrangement shown, the supply of solder 52 is provided as a winding of length of solder that is positioned within the body of the cartridge 51 so that the solder supply 52 can be unwound in the direction toward finger member 53. It is preferred that the cartridge 51 includes a sleeve 61 throughout the length of finger member 54. Preferably, sleeve 61 continues for a short distance into the top panel 62 of the cartridge 51. Sleeve 61 includes an opening 63 to the inside volume of the cartridge 51. The sleeve 61 also has an external opening 64. This structure allows for the supply of solder 52 to pass through internal opening 63, through sleeve 61, and out of external opening 64.

In addition, the portion of sleeve 61 that is in communication with opening 54 is not enclosed. This means that when cartridge 51 is inserted into the pocket 26 of device 11, the edge 41 of pawling means 33 may contact the supply of solder 52 while it is within sleeve 61.

If desired, the supply solder 52, when wound as shown in FIG. 5, may be contained on and within a spool 65. Spool 65 may contain an axle 66 around which the supply of solder 52 is wound.

Axle 66 need not be attached to the side panels 67 of cartridge 51, although this cartridge structure is within scope of this invention. In the preferred form shown in FIG. 5, the function that would be performed by having axle 66 in rotatable communication with side panels 67 is accomplished by sizing spool 65 such that it is freely rotatable within cartridge 51. Rotation of spool 65 may be further aided by providing finger grip indentation 68. Grip 68 is preferably of a generally triangular figuration to permit the operator to grip the cartridge 51 for its removal from pocket 26 of device 11. This configuration of grip 68 likewise provides a surface for sliding, suspending and resting contact for spool 65 to facilitate its rotation when axle 66 is not in rotatable communication with side panels 67.

In the preferred cartridge 51, a slot 71 is provided in its bottom panel 72. This slot 71 is dimentioned to receive a securement clip 73 (FIG. 3) which is securely fasened to the bottom, inside surface of pocket 26. The combination of slot 71 and clip 73 assists in holding cartridge 51 in place within pocket 26 and accomplishes a positive, snap-in type of fit.

FIG. 6 shows a cartridge 51 having an alternate means for effecting the snap-in type of fit. Instead of slot 71, there is provided a projection 74. Projection 74 is structured for mating relationship with a suitable means such as clip 73 or one or more beads 75 (FIG. 2). Projection 74 may take any suitable form, such as a single tooth, a plurality of teeth positioned in a row along the width of bottom panel 72, a single ridge along the width of bottom panel 72, or the like.

FIGS. 6 and 7 illustrate the additional optional embodiments of cartridge 51 when it includes ferrule 56 on finger member 53 at its external opening 64. Ferrule 56 may be untapered as shown in FIG. 3, it may be beveled outwardly as shown in FIG. 6, or it may be tapered inwardly as shown in FIG. 7. Whatever the structure of ferrule 56, a complementary structure is provided for in open receiving 23 of the guiding conduit 21.

It is preferred that cartridge 51 include friction plate 76. Plate 76 provides a frictional contact upon the supply of solder 52 as it passes through sleeve 61. In its preferred form, plate 76, as shown in FIG. 6, has its upper edge angled forwardly in order to impart greater frictional forces upon solder supply 52 when solder 52 tends to move rearwardly through sleeve 61. By the same token, only minimal frictional forces are applied by pressure plate 76 as the supply of solder 52 passes forwardly through sleeve 61 and out of external opening 64.

When a cartridge 51 that employs this preferred structure of plate 75 is used in combination with device 11, advantageous effects can be achieved. Since plate 76 provides minimal frictional force as solder 52 moves forwardly, it provides little resistance as pawling means 33 passes from its loading position (FIG. 1) through its spent position (FIG. 2). Then, advantageously, as pawling means 33 moves from its spent position back to its loading position, plate 76 provides adequate frictional forces so as to prevent the bias of spring 36, transmitted to edge 41 of pawl 35, from passing the supply of solder 52 back into cartridge 51.

Figure 8:
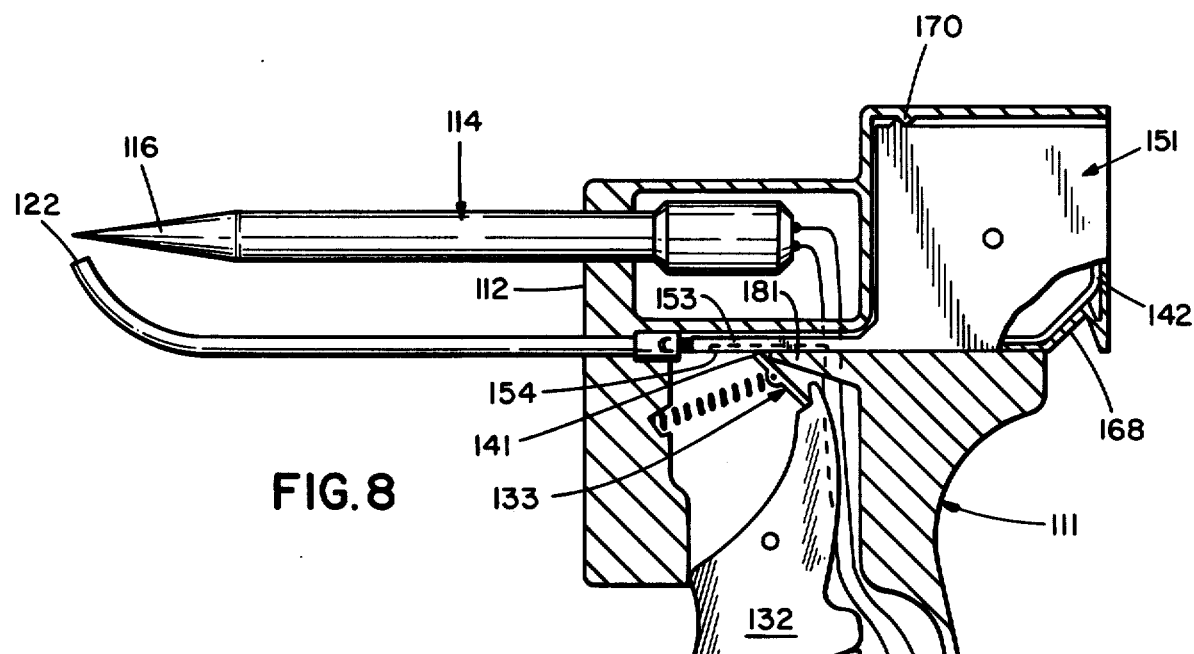
FIG. 8 is an elevation view of an alternate embodiment of the device and cartridge, with the casing broken away for clarity.

FIG. 8 depicts an alternate embodiment of the device, generally indicated by reference numeral 111, and the cartridge, generally referred to by reference numeral 151. This embodiment is especially useful when it is important to provide an encased supply of solder 152 through an open remote end 122 that is below a soldering tip 116.

The embodiment of FIG. 8 includes a pawling means generally indicated by reference numeral 133, that is positioned beneath the soldering member, generally referred to by reference numeral 114. Also, when compared with the cartridge 51 of the preferred embodiment, the cartridge 151 of this alternate embodiment is upside-down. This being the case, opening 154 of cartridge 151 is located on finger member 153 on its side that is opposite to that of opening 54 in finger member 53.

By the same token, looking at cartridge 151 itself, finger grip indentation 168 is on the same general surface as opening 154. And, snap-in means 170 is located above cartridge 151.

FIG. 8 also clearly illustrates a structural feature that can be relied upon in order to bring about the two different functions depicted in FIGS. 1 and 3. This shows that edge 141 of pawling means 133 can be in communication with a projection 181 within body 112. This is a resting communication, and it occurs when pawling means 133 is in its rearwardmost, loading position.

When control member 132 is moved slightly rearwardly so as to close the electrical switch means, generally referred to by reference numeral 134, the pawling means 133 moves from its loading position to its solder-contacting position, on the order of that shown in FIG. 3. The advantages of providing both a loading position and a solder-contacting position are discussed elsewhere herein.

Figure 9:
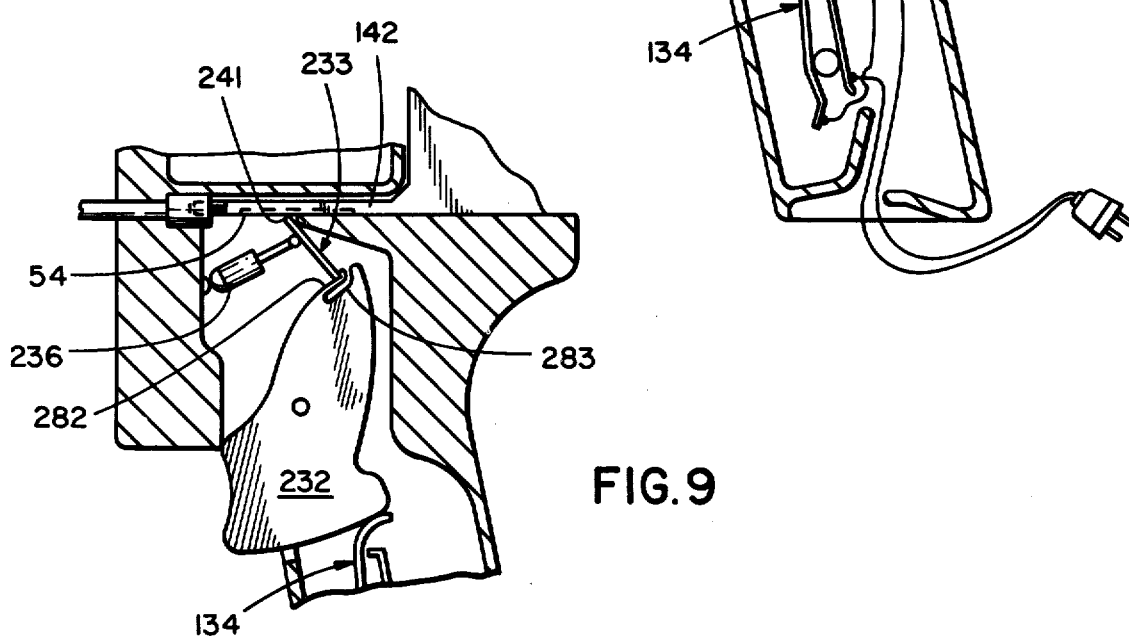
FIG. 9 is an elevation view of alternate embodiments of the pawling means of the device.

FIG. 9 depicts an alternate structure for providing both a loading position and a solder-contacting position to permit closing the switch means 134 without advancing the solder supply 142. In this embodiment, the pawling means, generally referred to by reference numeral 233, includes a resilient member 282. Member 282 may be a leaf spring such as that shown or it may be a coil spring or the like. Resilient member 282 provides a resilient force that is lower in magnitude than that of biasing means 236. It will be noted that biasing means 236 is shown as a piston and cylinder; it may take any suitable form, including that of the coil spring depicted in the other figures.

The structure of this embodiment makes possible the closing of switch means 134 without a forward movement of the edge 241 of pawling means 233. As control member 232 is moved until switch means 134 is initially closed, the weak resistance provided by resilient member 282 is overcome until that member 282 is prevented from moving farther by the inside surface of detent 283. The resilient member 282 remains in this position as control member 232 is moved until pawl means 233 moves to its spent position.

Obviously, many modifications and variations of the invention as hereinbefore set forth may be made without the parting from the spirit and scope thereof, and only such limitations should be imposed as are indicated in the appended claims.

We claim:

1. An improved solder device, comprising: a body portion; a soldering member and guiding conduit projecting from said body portion;
   a control member pivotally mounted within said body portion;
   an electrical switch means for actuating said soldering member, said switch means being located for communication with said pivotally mounted control member;
   and a pawl means for advancing a supply of solder through said guiding conduit, said pawl means being located for communication with said control member, said control member including a recess near its upper end facing the general direction of the solder supply advance and said pawling means being mounted to seat within the recess when in pawling engagement with the solder.

2. The device of claim 1, wherein said control member includes a curved edge near its bottom end for said arcuate communication with the switch means.

3. The device of claim 1, wherein said electrical switch means includes a front flexible contact arm and a rear flexible contact arm.

4. The device of claim 3, wherein said front flexible contact arm has a rearwardly curved upper portion.

5. The device of claim 3, wherein said rear flexible contact arm has a forwardly directed upper portion.

6. The device of claim 1, wherein said pawl means includes a pawl for communication with said control member, a biasing means connected to said pawl, and an upper edge of said pawl.

7. The device of claim 6, wherein a source of solder is within said body and said guiding conduit, and wherein said upper edge of the pawl is in pawling communication with said source of solder.

8. The device of claim 6, wherein said device includes a means for selectively actuating the electrical switch means without activating the pawl means and for selectively activating the pawl means while intermittently actuating the electrical switch means.

9. An improved solder device, comprising: a body portion; a soldering member and guiding conduit projecting from said body portion;
   a control member pivotally mounted within said body portion;
   an electrical switch means for actuating said soldering member, said switch means being located for arcuate communication with said pivotally mounted control member.
   and a pawl means for advancing a supply of solder through said guiding conduit, said pawl means being located for communication with said control member, said control member including a recess near its upper end facing the general direction of the solder supply advance and said pawling means being mounted to seat within the recess when in pawling engagement with the solder.

10. The device of claim 9, wherein said control member includes a curved edge near its bottom end for said arcuate communication with the switch means.

11. The device of claim 9, wherein said electrical switch means includes a front flexible contact arm and a rear flexible contact arm.

12. The device of claim 11, wherein said front flexible contact arm has a rearwardly curved upper portion.

13. The device of claim 11, wherein said rear flexible contact arm has a forwardly directed upper portion.

14. The device of claim 9, wherein said pawl means includes a pawl for communication with said control member, a biasing means connected to said pawl, and an upper edge of said pawl.

15. The device of claim 14, wherein a source of solder is within said body and said guiding conduit, and wherein said upper edge of the pawl is in pawling communication with said source of solder.

16. The device of claim 14, wherein said device includes a means for selectively actuating the electrical switch means without activating the pawl means and for selectively activating the pawl means while intermittently actuating the electrical switch means.

* * * * *